United States Patent
Lin et al.

(10) Patent No.: US 7,542,161 B2
(45) Date of Patent: Jun. 2, 2009

(54) SYSTEM AND METHOD FOR DETERMINING AN OPTIMAL BATCH SIZE FOR A PRINT JOB

(75) Inventors: Jie Lin, Webster, NY (US); Timothy W. Jacobs, Fairport, NY (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 852 days.

(21) Appl. No.: 11/254,501

(22) Filed: Oct. 20, 2005

(65) Prior Publication Data

US 2007/0092323 A1 Apr. 26, 2007

(51) Int. Cl.
*G06F 3/12* (2006.01)

(52) U.S. Cl. .................. 358/1.15; 358/1.6; 358/1.12; 358/1.13

(58) Field of Classification Search .............. 358/1.12, 358/1.13, 1.15, 400; 101/484; 707/104.1
See application file for complete search history.

(56) References Cited

U.S. PATENT DOCUMENTS

| | | | |
|---|---|---|---|
| 6,805,502 B2 * | 10/2004 | Rai et al. | 358/1.15 |
| 7,061,636 B2 * | 6/2006 | Ryan et al. | 358/1.15 |
| 7,092,963 B2 * | 8/2006 | Ryan et al. | 707/104.1 |
| 7,125,179 B1 * | 10/2006 | Rai et al. | 358/1.13 |
| 7,206,087 B2 * | 4/2007 | Ryan et al. | 358/1.15 |
| 7,382,484 B2 * | 6/2008 | Matsukubo et al. | 358/1.15 |
| 2001/0055123 A1 * | 12/2001 | Ryan et al. | 358/1.12 |
| 2002/0016803 A1 * | 2/2002 | Ryan et al. | 707/527 |
| 2002/0124756 A1 * | 9/2002 | Rai et al. | 101/484 |
| 2002/0129081 A1 | 9/2002 | Rai et al. | |
| 2003/0149747 A1 * | 8/2003 | Rai et al. | 358/400 |
| 2005/0060650 A1 * | 3/2005 | Ryan et al. | 715/526 |
| 2005/0134886 A1 * | 6/2005 | Farrell et al. | 358/1.13 |

FOREIGN PATENT DOCUMENTS

JP 2002304262 A * 10/2002

* cited by examiner

*Primary Examiner*—Twyler L Haskins
*Assistant Examiner*—Nicholas C Pachol
(74) *Attorney, Agent, or Firm*—Pepper Hamilton LLP

(57) ABSTRACT

A print job is received in a complex printing environment. The print job is decomposed optimal batch sizes by into method and system processing a print job by identifying a total processing time T(b) for each of multiple batch sizes, and the total processing time for each of the batch sizes are compared to determine which of the batch sizes is optimal for the printing environment.

17 Claims, 5 Drawing Sheets

SYSTEM AND METHOD FOR DETERMINING AN OPTIMAL BATCH SIZE FOR A PRINT JOB

TECHNICAL FIELD

The disclosure contained herein generally relates to printing and print job processing methods and systems.

DESCRIPTION OF THE RELATED ART

Conventional print shops typically are organized in a fashion so that related equipment is grouped together. For example, printing equipment may be grouped and located together, while finishing equipment may be grouped and located in another location. Thus, the print shop may be set up to have a printing department, a finishing department, and other departments corresponding to the type of process or operation that is performed within that department. The organization of a print shop is typically often independent of print job complexity, print job mix and total volume of print jobs.

When a new print job arrives, the print job sequentially passes through each department until the print job is completed. The conventional approach leads to significant time delays and increased work-in-progress and inventory costs.

U.S. Pat. No. 6,805,502, to Rai et al., the disclosure of which is incorporated herein by reference in its entirety, discloses an approach for dividing a print job into sub-jobs or "batches." The batches are separately processed so as to improve the total turnaround time that is required to complete the processing of the print job. The patent describes methods for selecting a batch size for batches so as to reduce the total turnaround time for the print job.

To further improve processing time and reduce work-on-progress and inventory costs, it is desirable to identify optimal batch sizes for batches in complex print shop environments, such as parallel processes, assembly lines and multi-functional devices.

The disclosure contained herein is directed to addressing one or more of the problems described above.

SUMMARY

In accordance with one embodiment, a method of processing a print job, includes receiving a print job in a printing environment that includes multiple print-related devices. The method may also includes a total processing time T(b) for each of a plurality of batch sizes b using a formula corresponding to:

$$T(b) = \sum_{i=1, i\beta}^{n} (s_i + bp_i) + X + \left(\frac{N}{b} - 1\right) \max_{i=1\epsilon(1,2,\ldots,n), i\beta} (s_i + bp_i, Y)$$

where $s_i$ represents setup time for a function i of a first device in the printing environment, $p_i$ represents processing time of one unit in the device function i, b represents a batch size for the print job, N represents the total number of items in the print job, and $\beta$ represents a set of functions on at least a second device in the printing environment, The method may also include comparing the total processing time T(b) for the plurality of batch sizes to determine which of the batch sizes is optimal for the printing environment.

In some embodiments, the method may also include dividing the print jobs into batches corresponding to the optimal batch size. It may also include printing the batches on the devices in the printing environment.

In some embodiments, the printing environment includes at least two devices that perform different functions of the print job in parallel. The second device may include one of the parallel devices, $\beta$ may represent a set of functions or the parallel devices; X may correspond to:

$$X = \max_{j\epsilon\beta}(s_j + bp_j).$$

Y may correspond to:

$$Y = \max_{j\epsilon\beta}(s_j + bp_j).$$

Function j may comprise a function of one of the parallel devices.

Alternately, the printing environment may include at least two devices that perform substantially the same functions of the print job in parallel. The second device may comprise one of the parallel devices; $\beta$ may represents a set of functions on the parallel devices;

$$X = \sum_{j\epsilon\beta} s_j + \frac{b}{\sum_{j\epsilon\beta} r_j};$$

and $$Y = \sum_{j\epsilon\beta} s_j + \frac{b}{\sum_{j\epsilon\beta} r_j}$$

where function j may comprise a function of one of the parallel devices.

$s_i$ may represent the sum of both inter-batch handling time and device setup time for function i on one of the non-parallel devices, and $s_j$ may represent the sum of both inter-batch handling time and device setup time for function j on one of the parallel devices.

Alternatively, the second device may comprises a multi-function device, $\beta$ may represent a set of functions on the multifunction devices, X may equal zero or an empty set, and Y may correspond to $$Y = \sum_{j\epsilon\beta}(s_j + bp_j),$$

where function j comprises a function of the multifunction device. $s_i$ may represent the sum of both inter-batch handling time and device setup time for a non-parallel function i on the multifunction device, and $s_j$ may represent the sum of both inter-batch handling time and device setup time for parallel function j on the multifunction device.

In some embodiments, T(b) may represent the total processing time for a plurality of batch sizes for a station in a multi-station environment having a plurality of stations and the method may also include determining an optimal batch size for at least two of the stations, as well as determining a station-to-station critical path in the printing environment.

In another embodiment, a print shop workflow management system includes a job decomposition module containing instructions for decomposing a print job into a plurality of batches, wherein the job decomposition module is programmed to implement a method that includes identifying a total processing time T(b) for each of a plurality of batch sizes b using a formula corresponding to:

$$xT(b) = \sum_{i=1,i\notin\beta}^{n} (s_i + bp_i) + X + \left(\frac{N}{b} - 1\right) \max_{i=1\in\{1,2,\ldots,n\},i\notin\beta} (s_i + bp_i, Y)$$

where $s_i$ represents setup time for a function i of a first print shop device, $p_i$ represents processing time of one unit in the device function i, b represents a batch size for the print job, N represents the total number of items in the print job, and $\beta$ represents a set of functions on at least a second print shop device. The method may also include comparing the total processing time T(b) for the plurality of batch sizes to determine which of the batch sizes is optimal for a printing environment.

Optionally, the job decomposition module may be embodied in a computing device, and the computing device may be in communication with the first and second print shop devices.

In some embodiments, the printing environment may includes at least two devices that perform different functions of the print job in parallel, the second print shop device may comprise one of the parallel devices, $\beta$ may represent a set of functions or the parallel devices, X may correspond to:

$$X = \max_{j\in\beta}(s_j + bp_j);$$

and Y may correspond to:

$$Y = \max_{j\in\beta}(s_j + bp_j);$$

where function j comprises a function of one of the parallel devices.

Alternatively, the printing environment may include at least two devices that perform substantially the same functions of the print job in parallel, the second device may comprise one of the parallel devices, $\beta$ may represent a set of functions on the parallel devices;

$$X = \sum_{j\in\beta} s_j + \frac{b}{\sum_{j\in\beta} r_j};$$

and $$Y = \sum_{j\in\beta} s_j + \frac{b}{\sum_{j\in\beta} r_j};$$

where function j comprises a function of one of the parallel devices.

Alternatively, the second device may comprise a multifunction device, $\beta$ may represent a set of functions on the multifunction devices, X may be equal to zero or an empty set, and Y may correspond to $$Y = \sum_{j\in\beta} (s_j + bp_j),$$

where function j comprises a function of the multifunction device.

In an alternate embodiment, a multifunction printing device includes a job decomposition module containing instructions for decomposing a print job into a plurality of batches. The instructions may include instructions to identify a total processing time T(b) for each of a plurality of batch sizes b using a formula corresponding to:

$$T(b) = \sum_{i=1,i\notin\beta}^{n} (s_i + bp_i) + \left(\frac{N}{b} - 1\right) \max_{i=1\in\{1,2,\ldots,n\},i\notin\beta} (s_i + bp_i, Y)$$

where $s_i$ represents setup time for a function i of an external device, $p_i$ represents processing time of one unit in the device function i, b represents a batch size for the print job, N represents the total number of items in the print job, and $\beta$ represents a set of functions on the multifunction device, and Y corresponds to $$Y = \sum_{j\in\beta} (s_j + bp_j),$$

and wherein the instructions further comprise instructions to compare the total processing time T(b) for the plurality of batch sizes to determine which of the batch sizes is optimal for a printing environment.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise herein, all technical and scientific terms used herein have the same meanings as commonly understood by one of ordinary skill in the art. All publications mentioned herein are incorporated by reference. Nothing herein is to be construed as an admission that the invention is not entitled to antedate such disclosure by virtue of prior invention.

Embodiments described herein relate to approaches for optimizing batch sizes or batches of a print job that are processed in a printing environment. Selected print jobs may be divided into smaller sized subcomponents known as "batches." The batches may be concurrently processed to ensure higher overall utilization of resources and faster turnaround time for print jobs. The batch sizes may be chosen to decrease the total time it takes to process the print job.

For purposes of the discussion below, a "print shop" or "printing environment" refers to a grouping of printing resources. The print shop may be a freestanding entity such as a commercial printer, or it may be part of a corporation or other entity. A "print job" refers to a logical unit of work that is to be completed for a customer. For example, a request to make 100 copies of a document constitutes a print job. Similarly, a request to print 1,000 copies of a book is a print job. A print shop is a grouping of equipment that can implement the print job.

Figure 1:
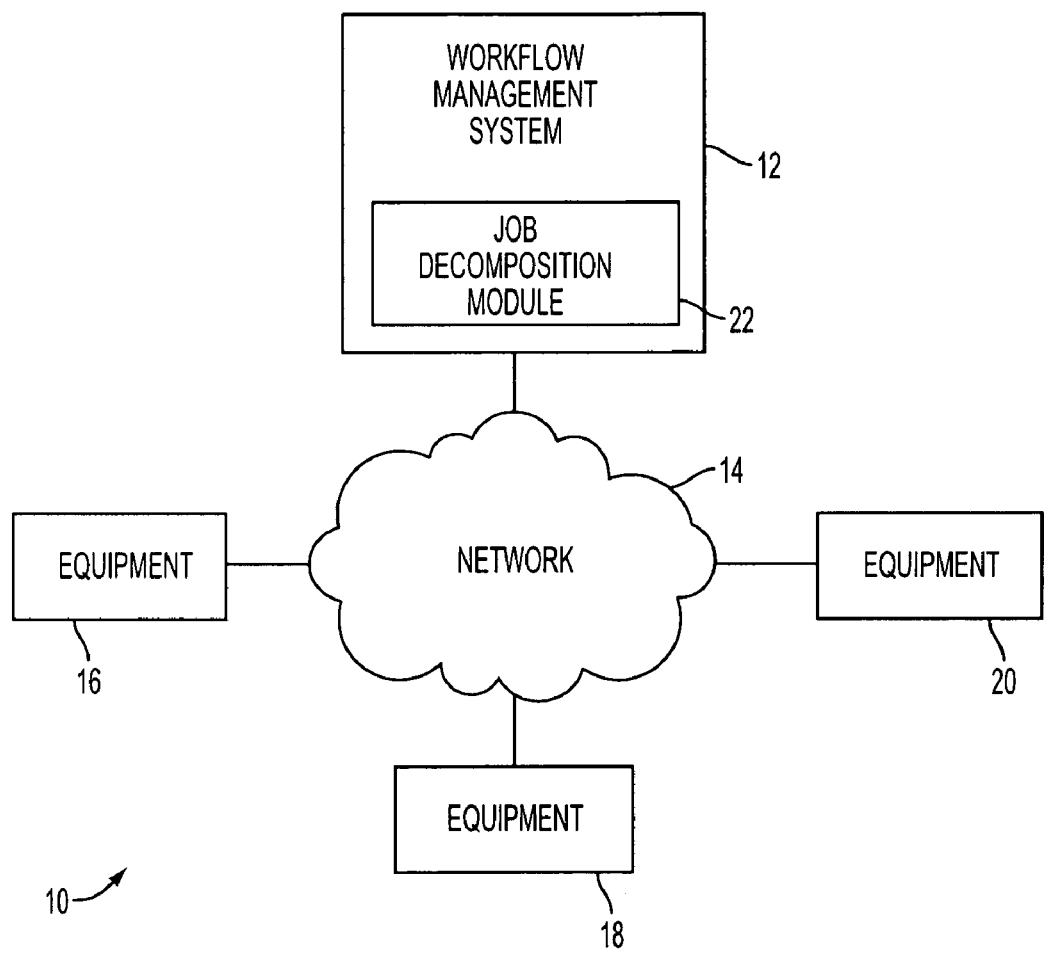
FIG. 1 is a block diagram that depicts elements of an exemplary printing environment.

FIG. 1 depicts an environment suitable for practicing the illustrative embodiments described herein. A print shop or printing environment may 10 include a workflow management system 12 that is responsible for managing workflow in the printing environment. The printing environment also includes equipment 16, 18 and 20 for completing the print job. The equipment may be of many different varieties. For example, the equipment may include a printer, a copier, a binder, a hole-punch, a collator, a sealer, a shrink-wrapper and/or any other variety of equipment that may be used to process and complete the print jobs. In the example depicted in FIG. 1, a communications network 14 interconnects the equipment 16, 18 and 20 with the workflow management system 12. The network 14 may include a local area network (LAN), a wide area network (WAN), a global network such as the Internet, or it may be formed by communication links that interconnect the equipment 16, 18 and 20 and the workflow management system 12. Nevertheless, those skilled in the art will appreciate that the embodiments described herein may also be practiced in environments where there is no network connection between the equipment and the workflow management system.

Those skilled in the art will appreciate that the depiction of FIG. 1 is intended to be merely illustrative and not limiting. The print shop may have more than three pieces of equipment or less than three pieces of equipment. In fact, one or more of the pieces of equipment may be a multifunctional device, which is a single device that performs printing, copying, collating, punching and/or other functions. In some embodiments, all of the equipment may be embodied in a single multifunctional device. Moreover, the workflow management system 12 does not need to have a communication path with the equipment 16, 18 and 20. Rather, the batches may be manually assigned to the equipment based on the optimal batch size information obtained by the workflow management system 12.

The workflow management system 12 may be implemented on a stand-alone computer system, such as a server computer system, a workstation, a laptop or another device such as the example described more fully in the text relating to FIG. 8 below. Alternatively, the workflow management system 12 may be integrated into the printing equipment, such as a printer, copier or the like. Still further, the workflow management system 12 may be implemented by distributing components that are realized as separate electronic devices. The workflow management system 12 may include a job decomposition module 22. The job decomposition module may contain instructions for decomposing print jobs into "batches." Not all print jobs need to be decomposed into batches. For example, if a customer wants a single copy of a document, the print job will likely not be partitioned into separate batches.

The job decomposition module 22 may be realized in software, firmware, or even hardware. The job decomposition module 22 may be run in a distributed fashion or in a tightly coupled fashion. Those skilled in the art will appreciate that there are multiple possible implementations for the job decomposition module 22.

Figure 2:
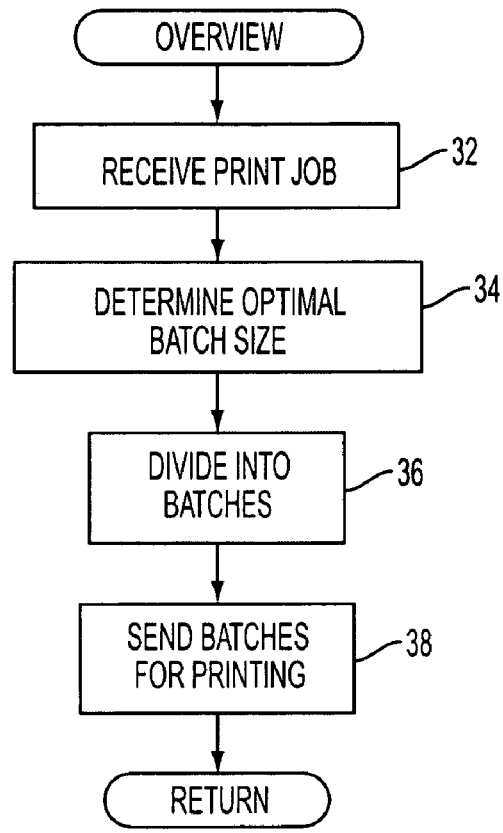
FIG. 2 is a flowchart that provides an overview of steps that may be performed to split print jobs into optimal-sized batches.

FIG. 2 provides an overview of several exemplary steps that may be performed in printing a print job in the illustrative embodiments disclosed herein. Initially, the print job may be received at the workflow management system 12 (step 32 in FIG. 2). The workflow management system 12 may then use the job decomposition module 22 to determine an optimal batch size for batches of the print job (step 34 in FIG. 2). This process of determining the optimal batch size will be described in more detail below. How the optimal batch sizes for print jobs are determined may depend upon the nature of the workflow required for each print job. As used herein "optimal" does not necessarily mean perfect or eliminating any lag time, but it does represent an improvement in process flow that may improve total processing time, eliminate equipment down time or reduce energy usage.

The print job is divided into batches (step 36 in FIG. 2). The batches are subsequently fed into the printing pipeline (formed by the equipment 16, 18 and 20) so that the batches are concurrently processed (step 38 in FIG. 2).

Figure 3:
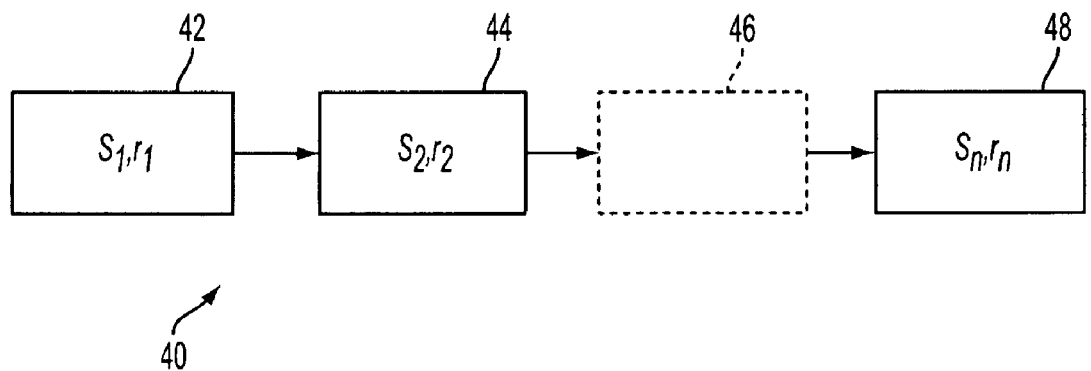
FIG. 3 depicts a graphic representation of a print job containing a serial sequence of operations without an assembly.

A work flow is a sequence of operations that will be performed to complete a print job. FIG. 3 shows an example of a serial sequence print job 40. In the representation shown in FIG. 3, each node, 42, 44, 46 and 48 represents a respective operation that is to be performed in the print job. The edges connecting the nodes 42, 44, 46 and 48 identify the flow and sequence of operations. Thus, operation 42 is first completed, followed by operation 44, which, in turn, is followed by operation 46, and so forth. In the example depicted in FIG. 3, node 46 is shown in phantom form to represent an aggregation of operations ranging from operation 3 to operation n-1. There are a total of n operations required by the exemplary print job 40 of FIG. 3.

An example is helpful to illustrate the representation of FIG. 3. Suppose that the first operation 42 to be performed on a print job is to print, and further suppose that the next operation 44 is to cut the paper that has been printed in the first operation. The final operation 48 is to bind the document. For each production item (e.g., a bound copy of the document), node 42 represents the printing of a production item. Node 44 represents the cutting of the printing paper for the production item. The arrow extending between node 42 and 44 illustrates that the results of printing 42 are passed to a cutting machine where the cutting 44 occurs. The final operation 48 represents the binding of a production item. In this illustration, node 46 may be optional.

Figure 4:
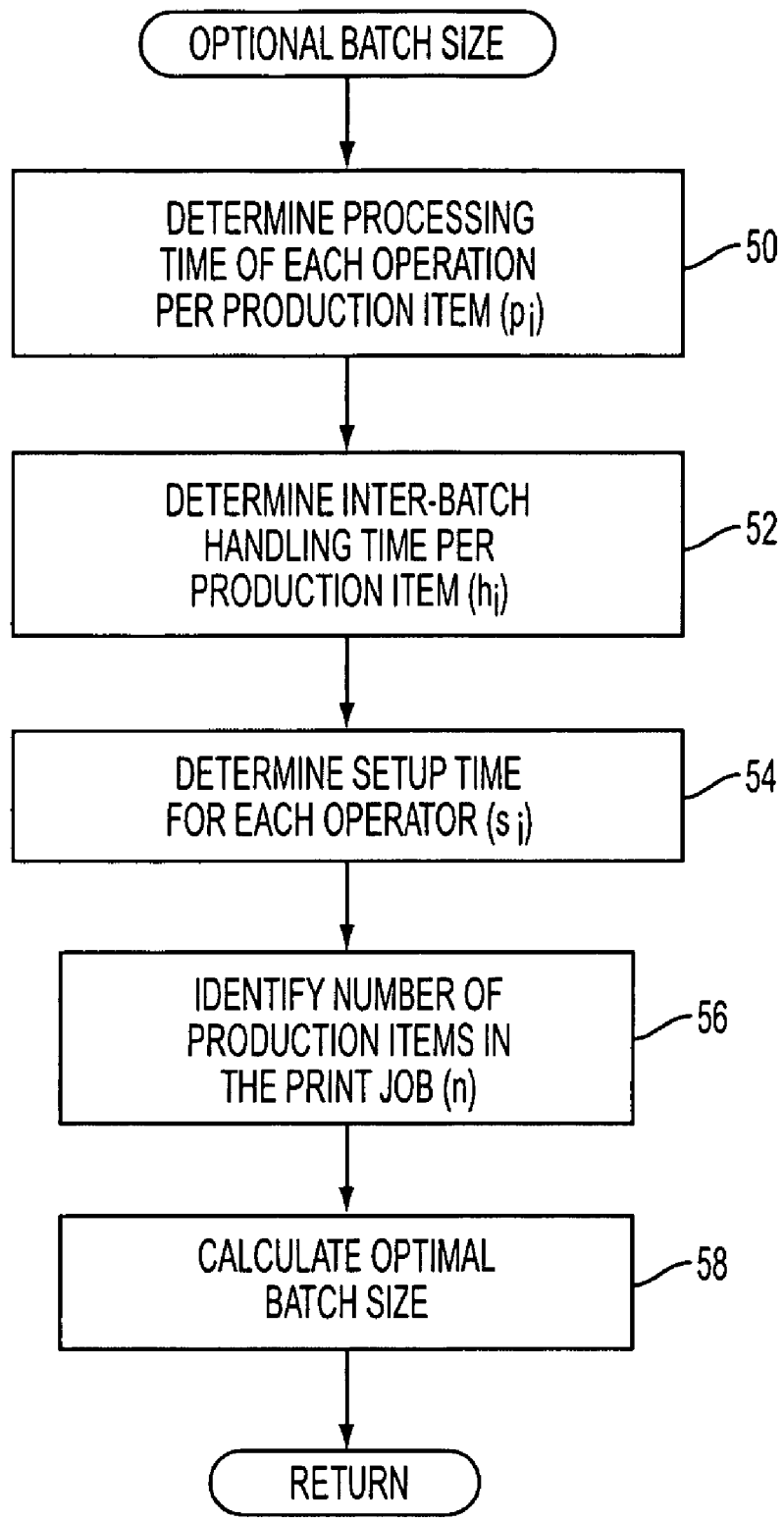
FIG. 4 is a flowchart illustrating steps that may be performed to determine an optical batch size.

FIG. 4 is a flow chart illustrating the steps that may be performed to determine an optimal batch size for a print job, such as the serial print job depicted in FIG. 3. The i variable refers to the number of operations in the print job sequence. Thus, for the first operation, i=1. Initially, the processing time of each operation per production item is determined (step 50 in FIG. 4). This processing time may be represented by the variable $r_i$. The processing time refers to how long it takes to complete the operation per production item. For the example where a document is being printed and bound and the first operation is printing, $r_i$ equals the time it takes to print a single copy of the document.

The inter-batch handling time ($h_i$) per production item may also be determined (step 52 in FIG. 4). The inter-batch handling time refers to the time it takes to switch between batches for a given operation. For example, suppose that a print job involves the steps of printing and tape binding. After books have been printed, it takes time to unload the books and send the books to the tape binder before the printing of the next batch may be initiated. This time represents inter-batch handling time $h_i$.

The setup time $s_i$ for each operation should also be determined (step 54 in FIG. 4). The setup time $s_i$ refers to the time it takes to set up or configure a piece of equipment to perform an operation. The setup time may be specified on a per production item basis. In some embodiments, inter-batch handling time and equipment setup time may together be represented by the variable $s_i$. Accordingly, steps 52 and 54 may be combined.

The number of production items n in the print job may also be identified (step 56 in FIG. 4).

Those skilled in the art will appreciate that the ordering of the steps in FIG. 4 is not intended to imply a required sequence in which the variables must be determined. Rather, variables may be determined in a different sequence and may merely generally be known in order to calculate an optimal batch size.

Given the information gathered in steps 50, 52, 54 and 56, the optimal batch size for the print job may be then be determined (step 58 in FIG. 4).

Serial Lines

In order to appreciate how an optimal batch size may be calculated, it is useful to first express the total production time $T_{prod}$ of a batch having a size b as follows:

$$T_{prod} = \sum_{i=1}^{n} [bp_i + s_i] + \left[\max_i (bp_i + s_i)\right]\left(\frac{N}{b} - 1\right)$$

where max ( ) is the maximization operator. Accordingly, the calculation of total production time considers setup and inter-batch handling time (together represented by $s_i$) as well as the batch-specific processing time ($bp_i$) at each station.

This expression of total production time includes terms that specify the time taken to process the first batch followed by the time taken to process the subsequent batches. The optimal batch size is the batch size that minimizes $T_{prod}$. In cases where the term $$\left[\max_i (bp_i + s_i)\right]$$

is independent of b, such as when there is one machine that dominates this term, an optimal batch size may be given by the following expression:

$$b = \sqrt{\frac{\max_i(s_i) N}{\sum_{i=1}^{n} r_i - \max_i(r_i)}}$$

In instances where the term is not independent of b, an optimal batch size may be determined using a mixed integer programming optimization algorithm, such as that found within the Microsoft Excel® or another appropriate program. The mixed integer programming optimization algorithm evaluates the following expression as a function of b:

$$\min\left[\left(\sum_{i=1}^{n} [bp_i + s_i]\right) + \left[\max_i (bp_i + s_i)\right]\left(\frac{N}{b} - 1\right)\right]$$

where min[ ] is the minimization operator.

Serial Lines with Parallelism in One or More Steps

Figure 5:
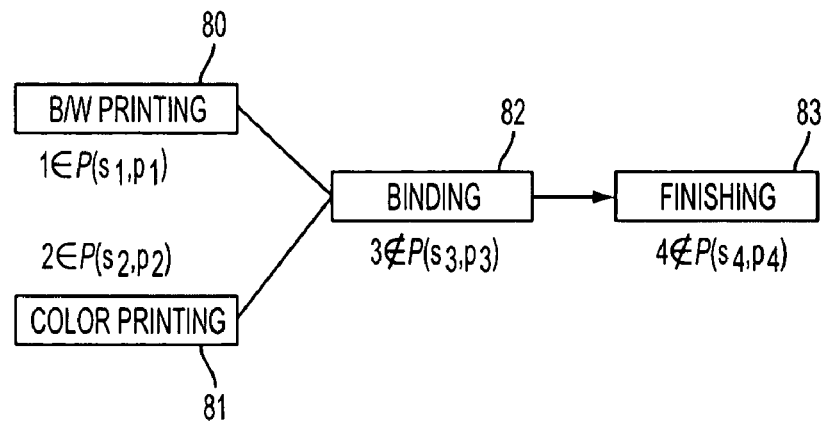
FIG. 5 illustrates an example of a printing operation containing parallel operations with combined output that proceed to further operations and finishing.

Sometimes, in a serial line, there may be multiple machines or multiple functions in a single machine performing identical functions or different functions in parallel such that the output of each functional station is assembled before moving to one or more downstream stations. For example, referring to FIG. 5, a print shop may include a black and white printing station 80 and a color printing station 81. Some pages may be printed at the black and white station 80, while other pages may be printed at the color printing station 81 at the same time. The pages output from both the black and white 80 and color 81 stations may be collected and bound at a binding station 82, and the bound document may be passed to a mailing station 83.

Without loss of generality, and as an example for illustration suppose that only one stage in the assembly line has parallel processes. Of course, one skilled in the art will recognize that this assumption is for illustration only, and that an assembly line may have more than one parallel process in the embodiments described herein. Denote by P the set of labels of the stations that are parallel in that stage. The total processing or turn around time T of a batch with size b may be given by the following:

$$T(b) = \sum_{i=1, i \notin P}^{n} (s_i + bp_i) + \max_{j \in P}(s_j + bp_j) +$$

$$\left(\frac{N}{b} - 1\right) \max_{i=1 \in \{1,2,\ldots n\}, i \notin P}\left(s_i + bp_i, \max_{j \in P}(s_j + bp_j)\right)$$

where j represents all of the machines that are in parallel, i represents the other machines (i.e., the machines that are not in parallel), $s_i$ is the setup time of machine i, $p_i$ is the processing time of one unit on machine i, $s_j$ is the setup time on machine j, $p_j$ is the processing time on machine j, and N is the total number of items in the job.

To obtain T(b), observe that all machines whose labels are set in P are working in parallel. But unless the slowest machine finishes its work, the next station in the downstream cannot start to process because it needs all outputs from those parallel machines. In the example, given in FIG. 5, the binder 82 needs to wait for both color pages from color printer 81 and black-and-white pages from black-and-white printer 80 before it can start binding the book. Therefore, the parallel machines 80 and 81 are effectively a single machine with processing time for one batch being $\max_{j \in P}(s_j+bp_j)$.

In various embodiments, it may be desirable but not required that the processing rate $p_k$, $k \in (1, 2, \ldots, n)$ may be defined in the same units. This is because in the scenario considered in this section, units in parallel machines may not be the same as the unit in a downstream station. For instance, copying machines in parallel could count units as impressions, whereas a folding machine in the downstream may consider units as books. Therefore, to calculate an optimal batch time it is desirable to have a consistent definition of processing rates so that when a batch is released to the machines in parallel, the processing time of each machine in parallel is given by $s_j+bp_j$, $j \in P$.

For example, suppose that a job is to print 10 books each with two-color covers and ten black-and-white impressions. Suppose the batch size is 2. When a batch is released to the printing stage, the color printer needs to print four pages, and the black-and-white printer needs to print 20 pages. Also suppose the printing rate of the color printer is 10 pages per minute, and the printing rate of the black-and-white printer is 100 pages per minute. If the unit of the overall batch is in books, $p_j$ and $r_j$ of the color printer may be 0.2 minutes per book and 5 books per minute (instead of 10 pages per minute) respectively, while $p_j$ and $r_j$ of the black-and-white printer may be 0.1 minutes per book and 10 books per minute (instead of 100 pages per minute) respectively.

Serial Line with Homogeneous Parallelism

In some cases, multiple machines may perform the same or similar functions in a parallel operation. For example, referring to FIG. 5, if color printing station 81 were replaced with a black and white printing station, the output from the machines 80 and 81 could be directly transferred to the binding station 82. In some embodiments, such parallel stations could transfer materials to the next station without waiting for other parallel operations to be completed.

In such a case, all of the outputs from the parallel machines may be delivered to the next station so that the next station gets the whole batch, rather than portions of a batch from each machine in parallel. For example, without loss of generality, assume that there is only one step, say step a, in a production line that has multiplicity. In addition, we denote by P the set of labels of those multiple machines in step a. It is desirable to have the machines in parallel finish processing their assigned portion simultaneously or at least close to the same time. When a batch is released to these machines in parallel, for each machine $j \in P$, we may assign $$\frac{r_i b}{\sum_{j \in P} r_j}$$

number of items which we will refer to as sub-batch. By further assuming that these machines will be set up prior to processing, we have that the entire batch will be finished by these machines in parallel in $$\sum_{i \in P} s_i + \frac{b}{\sum_{i \in P} r_i}$$

units of time.

As a result, the turn around time T(b) may now given by the following:

$$T(b) = \sum_{i=1, i \notin P}^{n} (s_i + bp_i) + \sum_{j \in P} s_j + \frac{b}{\sum_{j \in P} r_j} + \left(\frac{N}{b} - 1\right) \max_{i = 1 \in \{1,2,\ldots n\}, i \notin P} \left(\sum_{j \in P} s_j + \frac{b}{\sum_{j \in P} r_j}, s_i + bp_i\right)$$

where j represents the machines that are in parallel, i represents the other machines (i.e., the machines that are not in parallel) $r_i$ is the processing rate of machine i, $r_j$ is the processing rate of machine j, and $p_i$ is the processing time of one item on machine i.

Serial Line with Multi-Function Devices

As noted above, a print shop may have one or more multi-function devices (MFDs), which are machines that perform multiple functions, such as printing, copying, punching, collating, stapling, binding, finishing and/or other operations.

In the MFD case, we assume that more than one function of the MFD may be used in the serial line. Otherwise, it is just a simple serial line and we can use the serial line batch algorithm described above. Since an MFD is in one step of the serial line, this scenario is similar to the parallelism described above. However, even though the functions are provided by the MFD in a parallel fashion, those functions cannot be performed simultaneously by the MFD. Further, unlike the multiplicity case described above, the outputs of the MFD functions have to be delivered to downstream machines together. For example, an MFD may be used to print color and black-and-white impressions, both of which will be transferred to the binder in the downstream. The turn around time T(b) in this case may be given by the following:

$$T(b) = \sum_{i=1}^{n} (s_i + bp_i) + \left(\frac{N}{b} - 1\right) \max_{i \in \{1,2,\ldots n\}, i \notin \vartheta} \left(s_i + bp_i, \sum_{j \in \vartheta} (s_j + bp_j)\right)$$

where T is the set of labels of each functions of the MFD, $p_i$ is the processing time of one unit by function i, $s_i$ is the setup time of function i in the MFD, $p_j$ is the processing time of one unit by function j in the MFD, $s_j$ is the setup time of function j, and N is the total number of items in the job.

Assembly Line Without Parallelism

Finally, we consider an assembly line or production line without parallel processes. Unlike a simple serial line, an assembly line may have multiple serial lines operating in parallel. In fact, it could even include multiple lines having parallelism, all of which work together to achieve a common result. For an assembly line with one or more parallel processes, we can combine the results both above and in this section.

Figure 6:
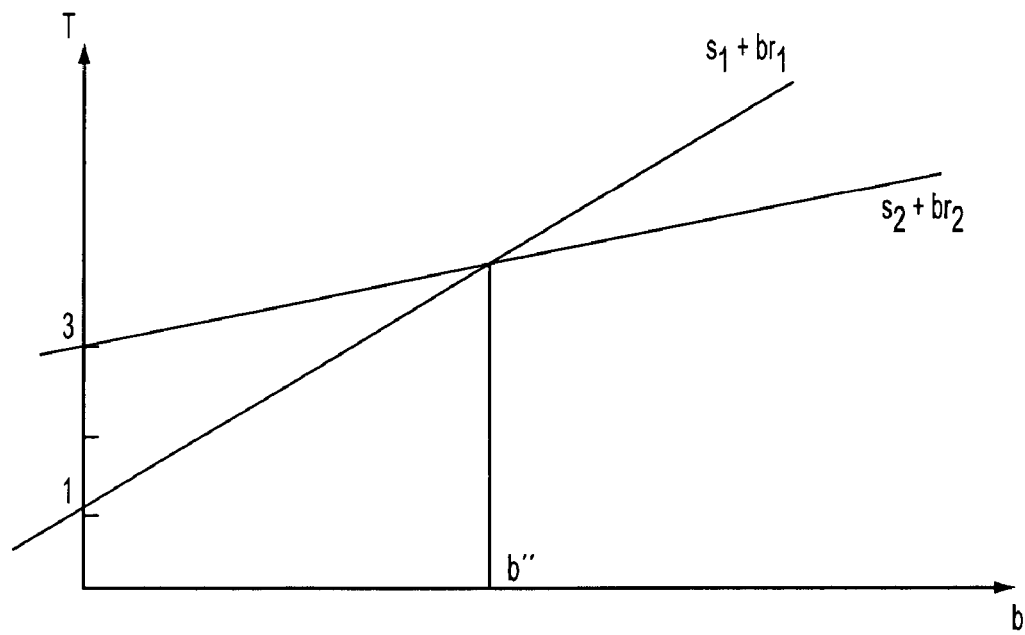
FIG. 6 is a graphic illustration of batch processing time for different machine sets and batch sizes.

Towards this end, we analyze the critical path of the production line to analyze a batch size for this type of production line. The critical path could change depending on the value of the batch size b. For example, suppose there are two stations having setup time $s_1$, $s_2$ and unit processing time $r_1$, $r_2$ respectively. Each station could include a single device, an MFD, or multiple devices working together in a serial and/or parallel fashion. The time to process a batch b is $s_1+br_1$ and $s_2+br_2$ respectively. As can be seen from FIG. 6, a vector representation may show a comparison of $s_1+br_1$ with $s_2+br_2$. $b^*$ may represent the batch processing time where the two vectors intersect. If b<b*, then $s_1+br_1 < s_2+br_2$. But if b>b, then $s_1+br_1 > s_2+br_2$. It is clear from this simple example that for a different value of b, a different set of machines may collectively become the critical path, i.e. the path with optimal production time, of the production line.

The critical path may be determined dynamically. Let $t_i = s_i + bp_i$, $i \in (1, 2, \ldots, m)$ denote the total processing time of a batch with size b on station i, and $$\bar{t}_i = t_i + \max_{j \in P_i} t_j,$$

where $P_i$ is the set of upstream stations with respect to station i. Here, $\bar{t}_i$, $i \in \{1, 2, \ldots, m\}$ is the elapsed time for processing a batch through station i. Therefore, $\bar{t}_m$, which is the elapsed time for batch through the last station in the line, may be the total turn-around time of a batch with size b determined by the critical path. In addition, in some embodiments each station may keep track of the upstream branch that gives the optimal processing time so far.

Figure 7:
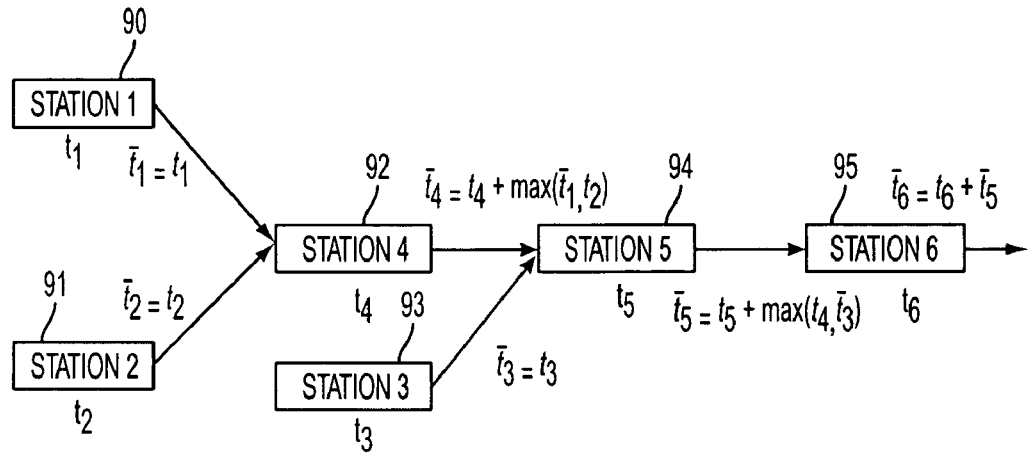
FIG. 7 illustrates an example of an assembly line without parallelism or multi-functional devices.

FIG. 7 illustrates an example of such a process. Each "station" may represent a single device, an MFD, or multiple devices connected in serial and/or parallel fashion. In this example, two stations 90 and 91 output results that are assembled and delivered to station 92. The output of station 92 is combined with the output of station 94, which in turn passes output to station 95.

Therefore, for every b, T(b) may be determined by the following equation using the stations in the critical path. We may then search through all possible values of b to get the minimal T(b):

$$T(b) = \sum_{i=1}^{n} [bp_i + s_i] + [\max_i (bp_i + s_i)]\left(\frac{N}{b} - 1\right).$$

As b changes, the critical path may change, but as long as the critical path is identified, the T(b) of the batch on that critical path is then determined by this equation.

Figure 8:
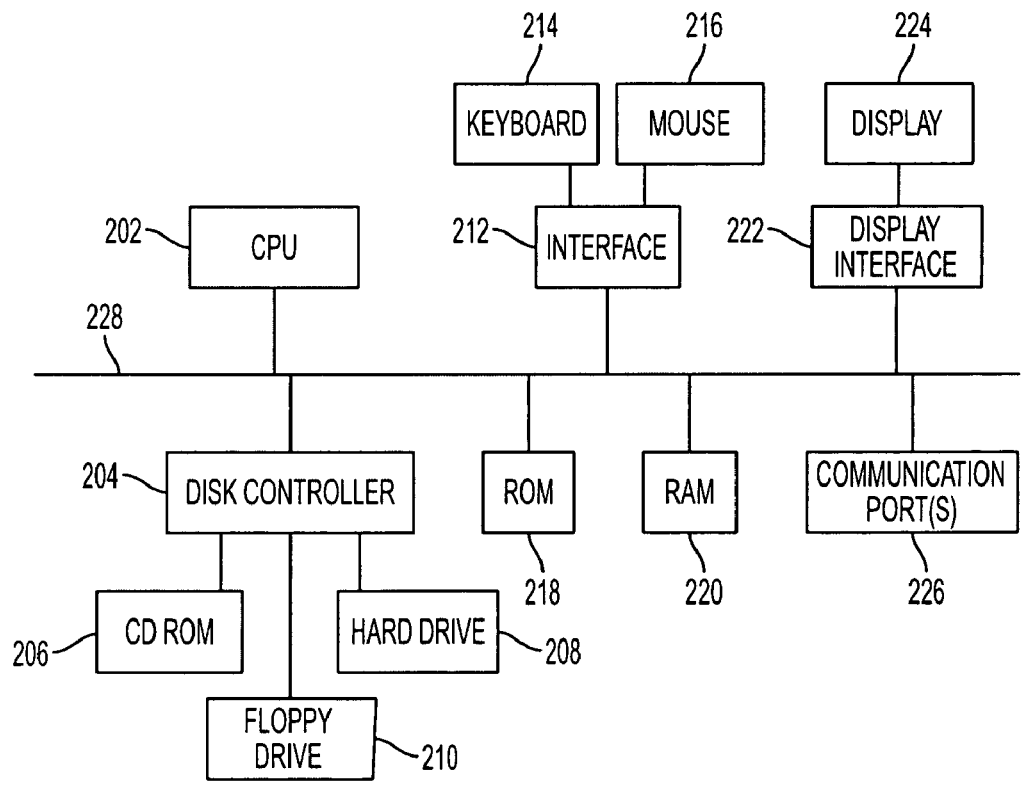
FIG. 8 illustrates exemplary components of a computer system that may implement some or all of the processes described herein.

FIG. 8 is a block diagram of exemplary hardware that may be used to contain and/or implement the program instructions of a system embodiment. Of course, any electronic device capable of carrying out instructions contained on a carrier such a memory, signal, or other device capable of holding or storing program instructions may be within the scope described herein. Referring to FIG. 8, a bus 228 serves as the main information highway interconnecting the other illustrated components of the hardware. CPU 202 is a central processing unit of the system, performing calculations and logic operations required to execute a program. Read only memory (ROM) 218 and random access memory (RAM) 220 constitute exemplary memory devices.

A disk controller 204 may interface with one or more optional disk drives to the system bus 228. These disk drives may be external or internal memory keys, zip drives, flash memory devices, floppy disk drives or other memory media such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick. A display including touch-screen capability may also be an input device 216. An exemplary touch-screen display is disclosed in U.S. Pat. No. 4,821,029 to Logan et al., which is incorporated herein by reference in its entirety.

An embedded system may optionally be used to perform one, some or all of the operations of the methods described. Likewise, a multiprocessor system may optionally be used to perform one, some or all of the methods described.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing a print job, comprising:
    receiving a print job in a printing environment, the printing environment comprising a plurality of print-related devices;
    identifying a total processing time T(b) for each of a plurality of batch sizes b using a formula corresponding to:

$$T(b) = \sum_{i=1,i\beta}^{n} (s_i + bp_i) + X + \left(\frac{N}{b} - 1\right) \max_{i=1 \in \{1,2,\ldots,n\}, i\beta} (s_i + bp_i, Y)$$

where $s_i$ represents setup time for a function i of a first device in the printing environment, $p_i$ represents processing time of one unit in the device function i, b represents a batch size for the print job, N represents the total number of items in the print job, and β represents a set of functions on at least a second device in the printing environment; and
    comparing the total processing time T(b) for the plurality of batch sizes to determine which of the batch sizes is optimal for the printing environment.

2. The method of claim 1, further comprising dividing the print jobs into batches corresponding to the optimal batch size.

3. The method of claim 2, further comprising printing the batches on the devices in the printing environment.

4. The method of claim 1, wherein:
    the printing environment includes at least two devices that perform different functions of the print job in parallel;
    the second device comprises one of the parallel devices;
    β represents a set of functions or the parallel devices;

X corresponds to:

$$X = \max_{j \in \beta}(s_j + bp_j); \text{ and}$$

Y corresponds to:

$$Y = \max_{j \in \beta}(s_j + bp_j);$$

where function j comprises a function of one of the parallel devices.

5. The method of claim 1, wherein:
the printing environment includes at least two devices that perform substantially the same functions of the print job in parallel;
the second device comprises one of the parallel devices;
β represents a set of functions on the parallel devices;

$$X = \sum_{j \in \beta} s_j + \frac{b}{\sum_{j \in \beta} r_j}; \text{ and}$$

$$Y = \sum_{j \in \beta} s_j + \frac{b}{\sum_{j \in \beta} r_j}$$

where function j comprises a function of one of the parallel devices.

6. The method of claim 5, wherein $s_i$ represents the sum of both inter-batch handling time and device setup time for function i on one of the non-parallel devices, and $s_j$ represents the sum of both inter-batch handling time and device setup time for function j on one of the parallel devices.

7. The method of claim 1, wherein:
the second device comprises a multifunction device;
β represents a set of functions on the multifunction devices;
X=0; and
Y corresponds to $$Y = \sum_{j \in \beta}(s_j + bp_j);$$

where function j comprises a function of the multifunction device.

8. The method of claim 7, wherein $s_i$ represents the sum of both inter-batch handling time and device setup time for a non-parallel function i on the multifunction device, and $s_j$ represents the sum of both inter-batch handling time and device setup time for parallel function j on the multifunction device.

9. The method of claim 1, wherein T(b) represents the total processing time for a plurality of batch sizes for a station in a multi-station environment having a plurality of stations and the method further includes:
determining an optimal batch size for at least two of the stations; and
determining a station-to-station critical path in the printing environment.

10. A print shop workflow management system, comprising:
a job decomposition module containing instructions for decomposing a print job into a plurality of batches, wherein the job decomposition module is programmed to implement a method comprising:
identifying a total processing time T(b) for each of a plurality of batch sizes b using a formula corresponding to:

$$T(b) = \sum_{i=1, i\beta}^{n}(s_i + bp_i) + X + \left(\frac{N}{b} - 1\right) \max_{i=1 \in \{1,2,\ldots,n\}, i\beta}(s_i + bp_i, Y)$$

where $s_i$ represents setup time for a function i of a first print shop device, $p_i$ represents processing time of one unit in the device function i, b represents a batch size for the print job, N represents the total number of items in the print job, and β represents a set of functions on at least a second print shop device; and
comparing the total processing time T(b) for the plurality of batch sizes to determine which of the batch sizes is optimal for a printing environment.

11. The system of claim 10, wherein:
the job decomposition module is embodied in a computing device; and
the computing device is in communication with the first and second print shop devices.

12. The system of claim 10, wherein:
the printing environment includes at least two devices that perform different functions of the print job in parallel;
the second print shop device comprises one of the parallel devices;
β represents a set of functions or the parallel devices;
X corresponds to:

$$X = \max_{j \in \beta}(s_j + bp_j); \text{ and}$$

Y corresponds to:

$$Y = \max_{j \in \beta}(s_j + bp_j);$$

where function j comprises a function of one of the parallel devices.

13. The system of claim 10, wherein:
the printing environment includes at least two devices that perform substantially the same functions of the print job in parallel;
the second device comprises one of the parallel devices;
β represents a set of functions on the parallel devices;

$$X = \sum_{j \in \beta} s_j + \frac{b}{\sum_{j \in \beta} r_j}; \text{ and}$$

$$Y = \sum_{j \in \beta} s_j + \frac{b}{\sum_{j \in \beta} r_j}$$

where function j comprises a function of one of the parallel devices.

14. The system of claim 10, wherein:

the second print shop device comprises a multifunction device;

β represents a set of functions on the multifunction device;

X=0; and

Y corresponds to $$Y = \sum_{j \in \beta} (s_j + bp_j);$$

where function j comprises a function of the multifunction device.

15. The system of claim 10, wherein T(b) represents the total processing time for a plurality of batch sizes for a station in a multi-station environment having a plurality of stations and the instructions further include:

determining an optimal batch size for at least two of the stations; and determining a station-to-station critical path in the printing environment.

16. A multifunction printing device comprising:

a job decomposition module containing instructions for decomposing a print job into a plurality of batches, the instructions comprising:

instructions to identify a total processing time T(b) for each of a plurality of batch sizes b using a formula corresponding to:

$$T(b) = \sum_{i=1, i \beta}^{n} (s_i + bp_i) + \left(\frac{N}{b} - 1\right) \max_{i=1 \in \{1,2,\ldots,n\}, i\beta} (s_i + bp_i, Y)$$

where $s_i$ represents setup time for a function i of an external device, $p_i$ represents processing time of one unit in the device function i, b represents a batch size for the print job, N represents the total number of items in the print job, and β represents a set of functions on the multifunction device, and Y corresponds to $$Y = \sum_{j \in \beta} (s_j + bp_j); \text{ and}$$

wherein the instructions further comprise instructions to compare the total processing time T(b) for the plurality of batch sizes to determine which of the batch sizes is optimal for a printing environment.

17. The device of claim 16, wherein T(b) represents the total processing time for a plurality of batch sizes for a station in a multi-station environment having a plurality of stations and the instructions further include:

determining an optimal batch size for at least two of the stations; and determining a station-to-station critical path in the printing environment.

* * * * *